United States Patent [19]
Billing et al.

[11] Patent Number: 5,220,428
[45] Date of Patent: Jun. 15, 1993

[54] DIGITAL VIDEO EFFECTS APPARATUS FOR IMAGE TRANSPOSITION

[75] Inventors: Robert Billing, Crowthorne; Nicholas Barton, Wokingham, both of United Kingdom

[73] Assignee: Questech Limited, Wokingham, United Kingdom

[21] Appl. No.: 669,397

[22] PCT Filed: Sep. 22, 1989

[86] PCT No.: PCT/GB89/01116

§ 371 Date: May 3, 1991

§ 102(e) Date: May 3, 1991

[87] PCT Pub. No.: WO90/03703

PCT Pub. Date: Apr. 5, 1990

[30] Foreign Application Priority Data

Sep. 22, 1988 [GB] United Kingdom ............... 8822269

[51] Int. Cl.⁵ ............................................ H04N 5/262
[52] U.S. Cl. .................................... 358/183; 358/160
[58] Field of Search ................. 358/183, 182, 22, 180, 358/160; 340/723, 724

[56] References Cited

U.S. PATENT DOCUMENTS

| | | | |
|---|---|---|---|
| 4,667,236 | 5/1987 | Dresdner | 358/22 |
| 4,875,097 | 10/1989 | Jackson | 358/182 |
| 4,922,345 | 5/1990 | Barton et al. | 358/183 |

FOREIGN PATENT DOCUMENTS

2229336 9/1990 United Kingdom .

Primary Examiner—James J. Groody
Assistant Examiner—Glenton B. Burgess
Attorney, Agent, or Firm—Jacobson, Price, Holman & Stern

[57] ABSTRACT

In a digital video effects system a data store (13) is provided for storing the address within a frame store of image information from the corresponding image frame that is to appear within another image frame as transposed on to a curved surface. The addresses are stored in "curved" order so that when the store (13) is addressed via inputs (24) providing the coordinates of the scanning point of the television raster, the store (13) provides, at an output (25) that address within the frame store which contains the image information to be represented at the corresponding point in the final image. Such storage of the address values in "curved" order is achieved by applying at data inputs of the store a linear sequence of the coordinate addresses of the image frame store whilst providing at write addresses (11, 12) of the store data (13) corresponding values of the coordinates that have been transformed to define the curved surface to appear in the final image.

11 Claims, 5 Drawing Sheets

DIGITAL VIDEO EFFECTS APPARATUS FOR IMAGE TRANSPOSITION

This invention relates to a method and apparatus for use with a digital video effects system to allow a variety of curved surface effects to be produced.

Existing systems to produce curved effects suffer from some or all of the following defects. Firstly they produce poor quality interpolation and edges, secondly they cannot expand the picture without loss of definition and thirdly they require excessive quantities of computation in order to produce a simple effect.

It is an object of the present invention to provide a means by which at least some of these disadvantages are overcome or at least reduced.

The invention accordingly provides a method for processing stored video images to reproduce image information from one image frame of a video signal so that it appears within another image frame of a video signal as if transposed onto a curved surface, comprising the steps of generating a first set of co-ordinate signals the values of which represent the co-ordinate positions of image information within a store containing the picture information of said one image frame, transforming the values of said first set of co-ordinate signals according to functions defining the desired curved surface in order to derive a second set of co-ordinate signals the values of which represent the co-ordinate positions within said other image frame at which the said curved surface will appear, addressing a data store with said second set of co-ordinate signals whilst writing into said data store the values of said first set of co-ordinate signals whereby at each co-ordinate address of the store defined by values of said second set of signals there are stored the corresponding values of the first set of signals, and addressing said data store with a third set of co-ordinate signals the values of which correspond to the co-ordinate positions of picture information to appear in said other image frame whilst addressing the store containing the picture information of said one image frame with the corresponding co-ordinate signals read from the data store, whereby the picture information of the one image frame is combined with the picture information of the other image frame to appear in the appropriate position.

The invention further provides a system for enabling stored video images to be processed to reproduce image information from one image frame of a video signal so that it appears within another image frame of a video signal as if transposed onto a curved surface, comprising means for generating a first set of co-ordinate signals the values of which represent the co-ordinate positions of image information within a store containing the picture information of said one image frame, means for transforming the values of said first set of co-ordinate signals according to functions defining the desired curved surface in order to derive a second set of co-ordinate signals the values of which represent the co-ordinate positions within said other image frame at which the said curved surface will appear, a data store, means for addressing said data store with said second set of co-ordinate signals, means for writing into said data store the values of said first set of co-ordinate signals whereby at each co-ordinate address of the store defined by values of said second set of signals there are stored the corresponding values of the first set of signals, and means for addressing said data store with a third set of co-ordinate signals the values of which correspond to the co-ordinate positions of picture information to appear in said other image frame, to derive corresponding values of said first set of co-ordinate signals from the data store for addressing said store containing the picture information to be processed.

In accordance with the invention, the said data store therefore acts as an intermediate address store in which are stored, in "curved order" not the picture information to be reproduced upon the curved surface, but values defining the co-ordinate positions of such information within an original frame store. Since this intermediate address store thus enables the original picture information of the one image frame to be read in "curved order" utilising the co-ordinate signals of the other image frame, the desired curved effect can be achieved without utilising curve defining functions to process the picture image information itself.

It will be appreciated that in view of the curved surface functions utilised to transform the first set of co-ordinate signals, the corresponding values of the second set of signals will not necessarily be whole numbers, despite the fact that integer values of these co-ordinate signals are utilised to address the data store. Therefore, in order to provide correction for the error vectors between the corresponding values of the sets of signals, the system in accordance with the invention preferably further comprises means for correspondingly adjusting the stored values of the first set of co-ordinate signals. These stored values will then comprise higher and lower order values, the values of the higher order serving for addressing of the frame store, and the values of the lower order serving to control the operation of an interpolater by means of which aliasing errors in the retrieved image information are prevented. Such a means of interpolating stored image information is known, and described, for example, in EP-A-0260997.

According to a further preferred feature of the invention, the means for transforming the values of said first set of co-ordinate signals is arranged to provide, in addition to the X and Y axis signals defining the position of information within the other image frame, a so-called Z-axis signal representing the perpendicular distance from the picture screen of the corresponding point on the imaginary three dimensional curved surface to be depicted. Means is further provided for storing the value of the Z-axis signal together with the corresponding X and Y values of the first set of signals, and for comparing the values of two Z-axis signals in the event that the same values of X and Y signals occur more than once in the second set of signals, indicating that the curved surface has turned over upon itself. In this way ambiguity in the storage of the first set of co-ordinate signals can be avoided.

In order to avoid ragged edges in the reproduction of the curved surface within the other image frame at folded edges of the curved surface, there is further provided, according to a preferred embodiment of the invention, an appropriate means for generating a so-called key-signal to control the mixing of picture information from the two image frames to be combined. For a further description of the use of such keying signals, reference may be made to EP-A-0260998.

The means for generating the key signal advantageously comprises means for analysing the values of said second set of signals and storing in said data store together with said first set of co-ordinate signals, data values that can be processed to generate the key signal as the data store is interrogated by said third set of co-ordinate signals.

The invention is illustrated by way of example in the accompanying drawings, in which.

Figure 3:
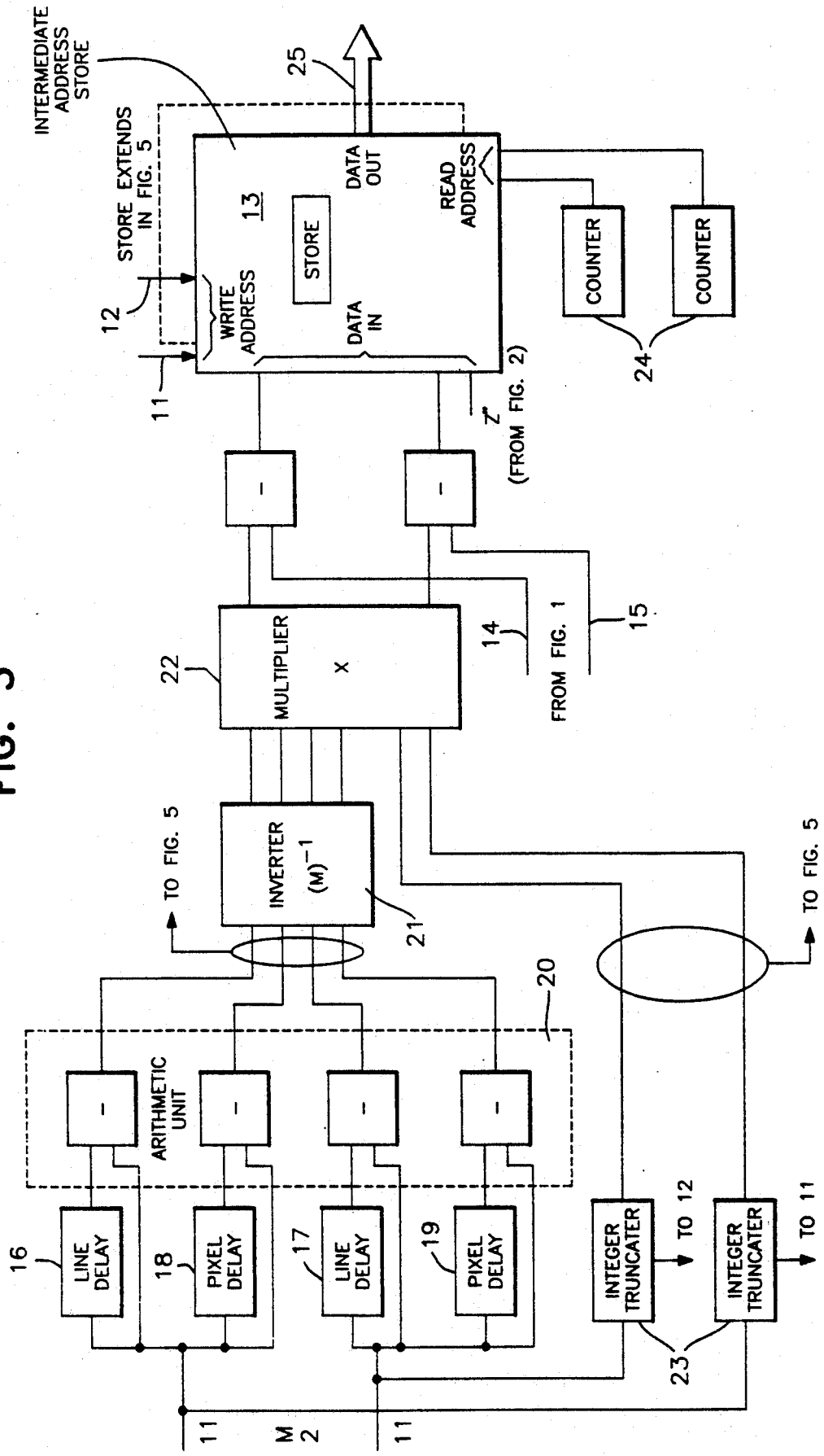
FIG. 3 is a block circuit diagram of a circuit for processing output signals of the circuit of FIG. 2, in order to generate and store addressing signals to be utilised in retrieving from a frame store picture image information to be displayed as appearing upon the curved surface defined by the co-ordinate signals from the circuit of FIG. 2.
Figure 4:
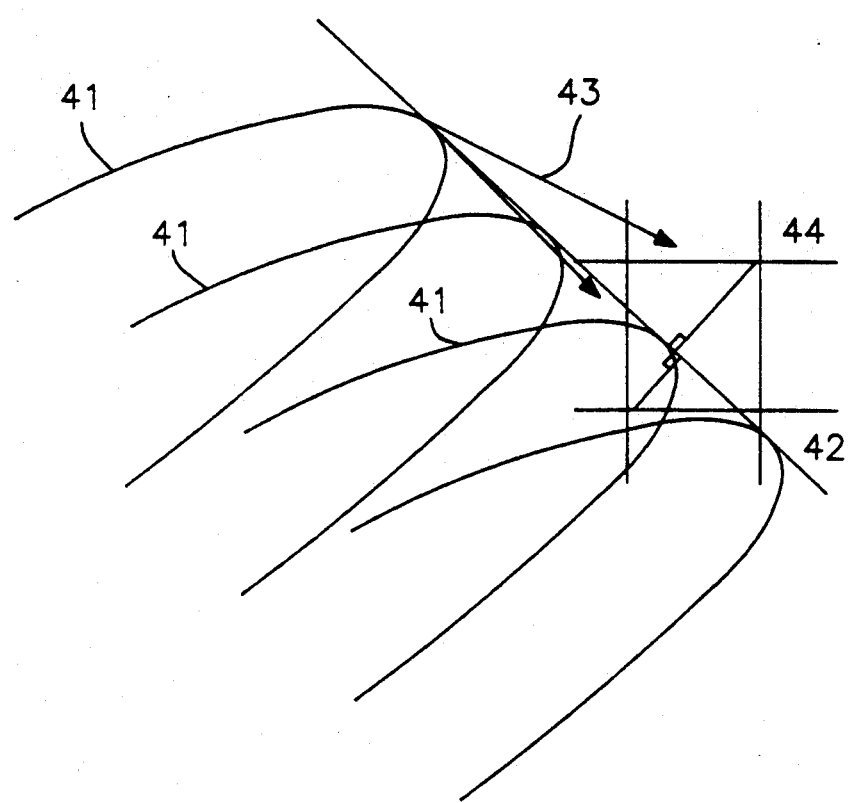
Figure 5:
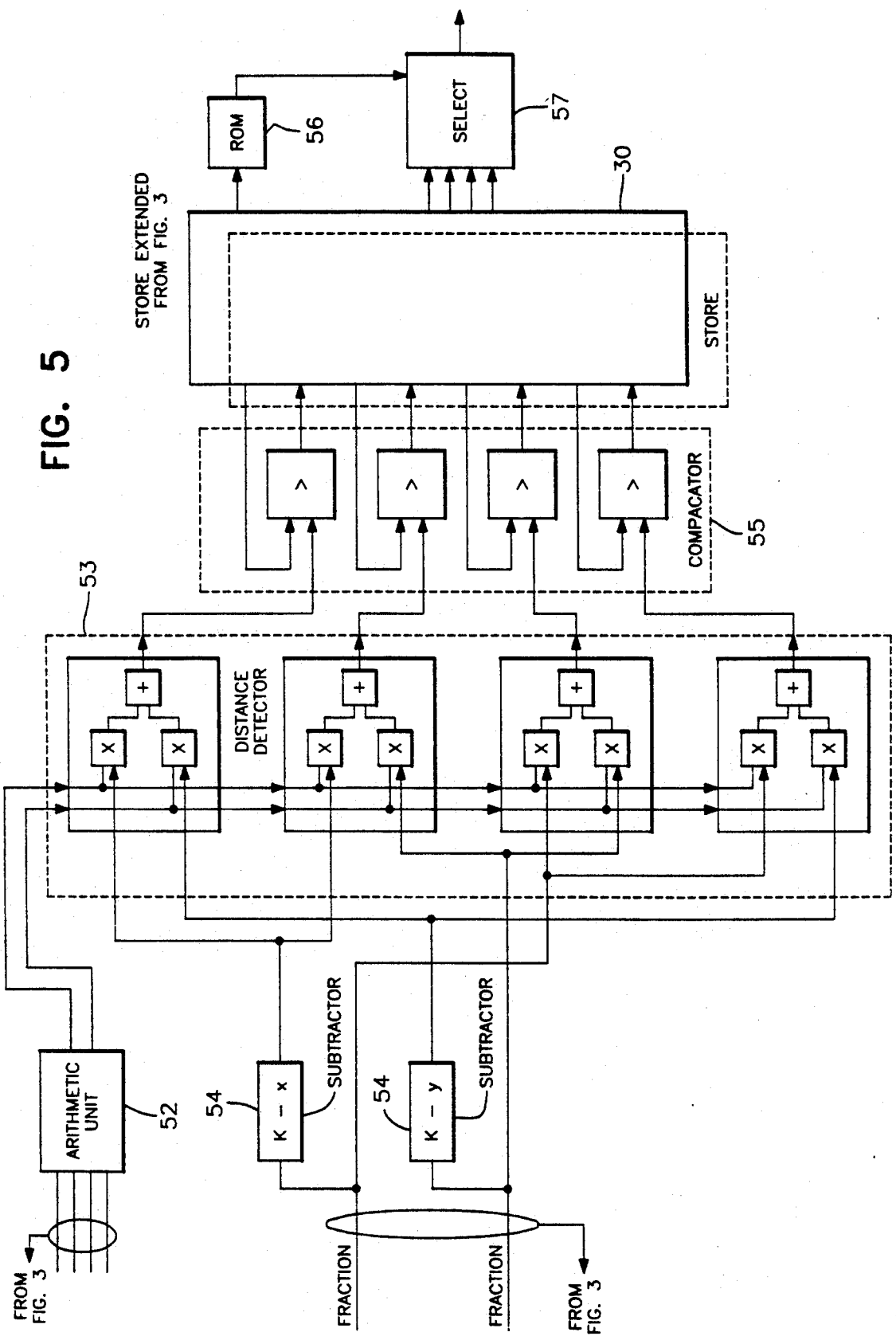

FIG. 4 is a diagram illustrating a method of generating a keying signal for controlling the combination of picture image information from the frame store to be addressed by the circuit of FIG. 3 and image information from another video image field within which the curved surface is depicted, and FIG. 5 is a block circuit diagram of a key signal generator arranged to operate according to the method illustrated in FIG. 4.

A curved surface may, in many cases, be described by the use of twelve functions, four each for the X, Y and Z co-ordinates. The mechanism for generating each co-ordinate is the same and hence will only be described once, with reference to FIG. 1.

The four functions for each co-ordinate are evaluated in two pairs, one function in each pair taking one of a pair of orthogonal co-ordinates in the input picture as parameter. The pairs of functions are combined by either multiplication or addition and the two results are either multiplied or added to produce the final co-ordinate.

Figure 1:
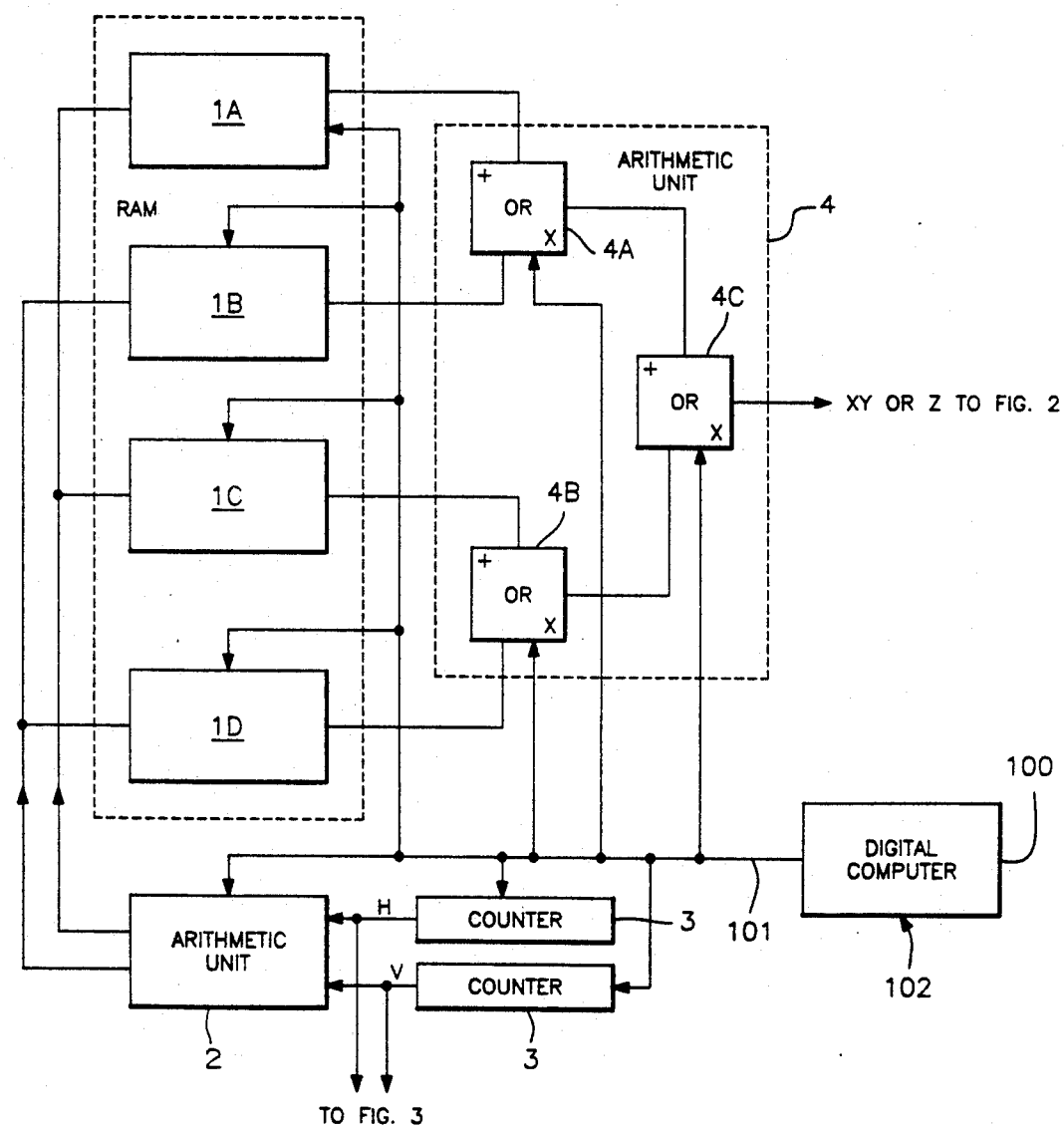
FIG. 1 is a block circuit diagram of a data processing circuit for generating a co-ordinate of a curved surface.

Thus the arrangement of FIG. 1 comprises a random-access memory 1A to 1D to hold successive values of the four functions, counters 3 to determine horizontal and vertical co-ordinates of an image frame, an arithmetic unit 2 to transform horizontal and vertical to arbitrary orthogonal co-ordinates and a second arithmetic unit 4 to convert the outputs of the random access memory to the final co-ordinates.

All of the elements of the circuit of FIG. 1 are individually controllable by means of a digital computer indicated diagrammatically at 100 and coupled thereto via a common data bus 101. The computer 100 has a manual control input indicated at 102, for example a conventional keyboard, and is controlled by an appropriate program to enable the manual selection of a desired curved surface of which the co-ordinates are to be generated. Such a program does not form part of the present invention and the manner in which such a program may be devised will be readily apparent to one skilled in the art of digital video effects. Suffice it to say that the program may provide to the operator of the computer a menu containing optional curved shapes to be depicted, from which a desired shape may be selected. Under control of the program the computer will then load the random access memories with the appropriate functions, set each of the elements 4A to 4C of each arithmetic unit 4 to operate as an adder or multiplier as necessary, and cause the counters 3 to generate linear series of horizontal and vertical co-ordinates. The computer may also control the starting count of each of the counters 3 for adjustment of the position of the curved figure within an image frame and may control the arithmetic unit 2 to adjust the angular orientation of the figure within the image frame.

The digital computer 100 further enables the curved figure defined by the X, Y and Z co-ordinates from the circuits of FIG. 1 to be transformed to allow the picture to be rotated and scaled and perspective applied. This is done with the circuit of FIG. 2.

Figure 2:
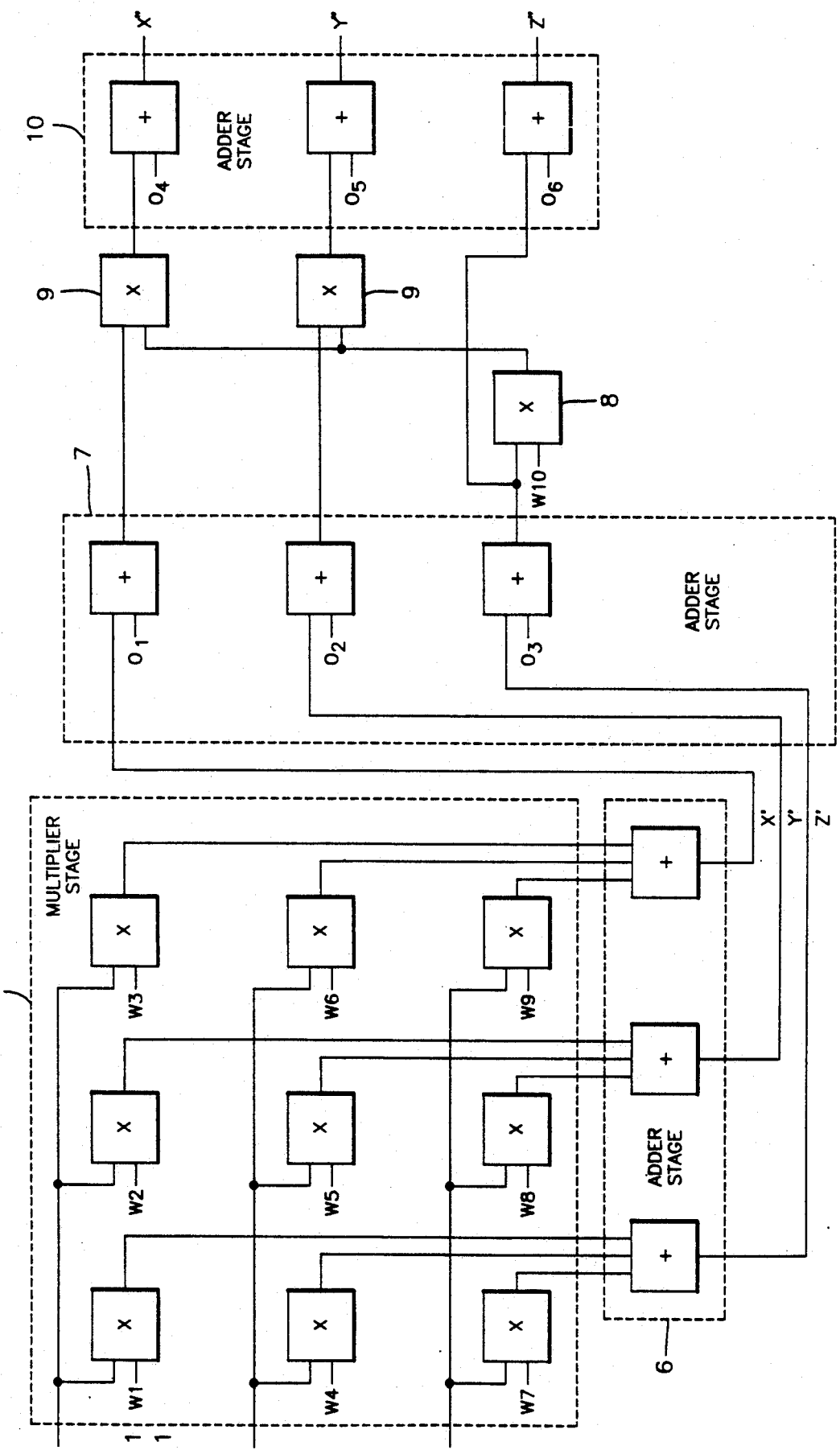
FIG. 2 is a block circuit diagram of a data processing circuit for processing co-ordinate signals from circuits such as shown in FIG. 1, in order to determine the position, orientation and perspective of a curved surface to be displayed within a video image field.

Referring to FIG. 2, a multiplier stage 5 comprises a grid of nine multipliers each of which has one input coupled to receive a corresponding X, Y or Z co-ordinate value from the circuit of FIG. 1 and the other input coupled, via the data bus 101, to receive one of nine weightings W1–W9 created by the digital computer 100. The signals from the outputs of the multiplier stage 5 are added in an adder stage 6 in such a way that the co-ordinate system is rotated and scaled. Once again, the manner in which the computer is programmed so that the values of the weightings W1–W9 are derived in accordance with the desired visual effect will be well understood by one skilled in the art.

The outputs of the adder stage 6 are coupled to inputs of further adders comprised by stage 7, each of which has a second input coupled to the data bus 101, whereby three offsets 01, 02, 03 can then be added to the X, Y and Z co-ordinate signals to centre the picture about the observer's eye.

Further multipliers 8 and 9 are coupled to the outputs of the adder circuit 7, an input of multiplier 8 being coupled to the data bus 101 to receive a weighting factor W10 whereby the Z co-ordinate is scaled in multiplier 8 and the result is used to scale the X and Y co-ordinates by multipliers 9 to provide perspective. The picture can then be offset to its final position in an adder stage 10, again by the application of offsets 04, 05 and 06 from the computer via data bus 101.

Having obtained the X, Y and Z co-ordinates which correspond to sequential locations in the input picture as scanned by a television camera it is necessary to use these in such a way as to produce the illusion that the input picture has been distorted to the defined shape. In order to avoid the picture defects mentioned above this is done in the circuit shown in FIG. 3.

It should be explained that the co-ordinates generated in the circuit of FIG. 2 are generated to a higher order of resolution than the horizontal and vertical co-ordinates produced by the counters 3 of FIG. 1, so that they can be regarded as containing both integer values as required for addressing a frame or data store, and intermediate fractional values.

The X and Y co-ordinate signals from the circuit of FIG. 2 are applied, inter alia, to circuits 23 from which the integer values of the X and Y co-ordinates are discarded and applied at inputs 11, 12 to address an intermediate address store 13 which is filled in a "curved" order with numbers applied at data inputs 14 and 15 and representing the input picture co-ordinates which were generated by the counters 3 of FIG. 1 in order to produce those particular X and Y co-ordinates.

Only the X and Y co-ordinates applied at inputs 11 and 12 determine the address in the store 13 at which the numbers are written. The Z co-ordinate is written as part of the number written to the store together with the data from inputs 14 and 15. If, during a particular field or frame time, the same point is revisited by the function (i.e. if the same X and Y co-ordinates occur twice at inputs 11 and 12), indicating that the curved shape has wrapped over itself, then the Z co-ordinates of the old and new points are compared to determine which is "in front" and hence to make the decision either to overwrite the old point in the store or to leave it where it is. This is effected by reading the already stored Z value from the store 13 and comparing it with the newly presented value, in a manner not shown.

Since the X and Y co-ordinates are not, in general, whole numbers there exists for each point represented by the whole numbers applied at inputs 14, 15, an error vector which represents the discarded fractional part of the X and Y co-ordinates. Correction for this error is achieved by applying the higher resolution X and Y co-ordinate values, via line delays 16, 17 and pixel delays 18, 19 to subtractors of an arithmetic unit 20 in order to construct a matrix of four partial differentials, representing the differentiation of the output co-ordinate system relative to the input at a point. This matrix can now be inverted at 21 and the result multiplied at 22 onto the error vector obtained by discarding at 23 the integer portions of the X and Y input signals. This gives a correction vector which can be subtracted from the numbers applied at inputs 14 and 15 which evaluate the input picture co-ordinates before they are written to the store. This process perturbs the data written into the store in such a way as to enable the "aliasing" effect which would be caused by simply discarding the fractional parts of the co-ordinates to be eliminated utilising an interpolator system as initially referred to above.

Thus, the intermediate address store 13 can now be read in order by a second set of counters 24 which generate co-ordinate values corresponding to the positions of picture information in the final video image field in which the curved surface is to be depicted. There is then obtained at an output 25 of the store 13 a sequence of integer values corresponding to addresses at which to read from a memory containing picture information, together with fractional values for control of the interpolator. Reading the picture information in this manner produces the illusion of the curved picture which is required, without undesired "aliasing". It will be appreciated that the values generated by the counters 24 will correspond with the co-ordinates of the scanning spot of the television raster and will be generated in real time in synchronism with the television signal. This does not necessarily apply to the values generated by the counters 3 and applied at inputs 14 and 15. It is only necessary that each cycle wherein the store is addressed via inputs 11 and 12 be completed between cycles in which the same storage locations are addressed by the counters 24. In practise this will normally require that the store 13 have areas corresponding to at least two image frames, that can be addressed independently.

In order to avoid the raggedness of the picture edges which would follow from the basic system described a further area may be added to the intermediate address store 13 as illustrated at 30 in FIG. 5.

This area, which is addressed by exactly the same signals as the rest of the intermediate address store, 13, is used to hold numbers which are used to determine how close the scanning point of the final picture is to a folded edge of the curved surface shown therein. FIG. 4 illustrates the method by which this is done. The curved lines 41 represent the scan lines of the original picture. Close to the edge of the picture the picture is compressed nearly to a straight line and hence all vectors in the source picture degenerate to vectors which are either very short or nearly parallel to the envelope of the curved scan lines as shown at 42.

By using the partial differentials obtained in FIG. 3 it is possible to determine the direction and length of the projection of the horizontal and vertical unit vectors in the original picture into the output effect. The direction of the longer of the two projections 43 will therefore lie broadly along the envelope.

It is then possible to calculate the length of a perpendicular from each of the four corners of a box 44 representing a location in the intermediate address store 13. These four numbers represent the distance from each corner of the box 44 to the line 42 representing the envelope, if the particular point being used lies on the envelope or sufficiently close to it. For each of the four numbers the maximum value given by any point which lands inside the box is determined by comparing the value for the current point with the value held in the store 30 and writing the larger of the two values. All locations in the store are set to zero at the end of each field.

When reading from the store it is then possible to determine which of the four numbers to use by examining adjacent points to determine the broad direction of the envelope.

Thus, in FIG. 5 the partial differentials from the stage 20 of FIG. 3 are sent to an arithmetic unit 52 which selects the column with the largest modulus and rotates the vector that it represents by a right angle. The resultant number is used to weight the distance of the point from the four corners of the box in stage 53. The distances are obtained by subtracting the co-ordinates of the point within the box from the co-ordinates of the corners of the box at stage 54. The resulting numbers, which represent the lengths of the perpendiculars, are compared with the values already in the store (at stage 55) and the larger value is written into the store 30.

On output from the store 30 when addressed by the counters 24 the eight neighbours of each pixel are tested and the pattern of written and unwritten store locations is used to address a read only memory 56 which controls which of the four numbers is read from the store, via a selector 57.

We claim:

1. A digital video effects apparatus for use in transposing a first video image held within a frame store, so that it appears within a second video image as if represented upon a curved surface, said apparatus including an intermediate address store having a read addressing input, a write addressing input, a data input and a data output; a first address generating means for generating consecutively addresses of said frame store corresponding to picture point coordinates of the video image held therein, an output of said address generating means coupled to said data input of said intermediate address store; means coupled to the output of said first address generating means for transforming the addresses of coordinate points of said frame store to correspond with the coordinates within said second video image at which the corresponding picture point is to appear, an output of said transforming means coupled to said write addressing input of said intermediate address store; and a second address generating means for generating coordinate addresses of said intermediate address store in the order in which corresponding coordinates of an image frame are scanned in a television picture signal, an output of said second address generating means being coupled to said read address input of said intermediate address store.

2. A digital video effects apparatus according to claim 1, wherein said transforming means is arranged to transform said coordinate point addresses to provide transformed values to a higher resolution than required to address the write addressing input of said intermediate address store, and means coupling the output of the transforming means to said write addressing input and to said data input of said intermediate address store is provided to direct higher orders of said transformed values to said write addressing input and to direct lower orders of said values to said data input of the intermediate address store.

3. A digital video effects apparatus according to claim 2, wherein said means coupling the output of said transforming means to said data input of the intermediate address store includes an error vector correction circuit for deriving, from said transformed values, error vectors modifying the data applied to said data input of the intermediate address store from said first address generator.

4. A digital video effects apparatus according to claim 3, wherein said error vector correction circuit includes: a first signal input coupled to a first output of said transforming means providing transformed values of one address coordinate; a second signal input coupled to a second output of said transforming means providing transformed values of a second address coordinate; first, second, third and fourth subtracting means each having first and second inputs and an output, said second inputs of said first and second subtracting means coupled to said first signal input and said second inputs of said third and fourth subtracting means coupled to said second signal input; first and second line delay means respectively connected from said first and second inputs to said first inputs of said first and third subtracting means; first and second pixel delay means respectively connected from said first and second signal inputs to said first inputs of said second and fourth subtracting means; an inverting circuit coupled to the outputs of said subtracting means and providing the reciprocal of a matrix of signal values received therefrom; means coupled to said first and second signal inputs for separating from said transformed coordinate values the said lower order values thereof; and multiplying means coupled to outputs of said inverting means and said separating means.

5. A digital video effects apparatus according to claim 1, wherein said transforming means is coupled to a processor having a manual control input, said processor being capable of being programmed to define the curved surface to be represented by said transformed coordinate addresses in accordance with commands received from said manual input.

6. A digital video effects apparatus according to claim 5, wherein said transforming means includes first and second inputs respectively coupled to first and second outputs of said first address generating means that provide, respectively, vertical and horizontal coordinate values of picture points in said frame store; a plurality of random access memories coupled to each of said first and second inputs and each coupled to receive from said processor consecutive values of one of a set of functions defining said curved surface, and a plurality of controllable arithmetic units coupled to said processor, each arithmetic unit having inputs coupled to outputs of a respective group of said random access memories and an output providing the value of one transformed coordinate of a point in said second video image.

7. A digital effects apparatus according to claim 6, wherein said transforming means includes means controllable by said processor and coupled between the said first and second inputs and said random access memories, for transforming said vertical and horizontal coordinate values to values of arbitrary orthogonal coordinates within the picture held in said frame store.

8. A digital video effects apparatus according to claim 6, wherein said transforming means has three outputs for providing, respectively, values of X, Y and Z coordinates of a point in said second video image.

9. A digital video effects apparatus according to claim 8, wherein the outputs of said transforming means providing the X and Y coordinates values are coupled to the said write address input of the intermediate address store, and the output providing the Z coordinate value is coupled to a data input of said intermediate address store.

10. A digital video effects apparatus according to claim 8, wherein the said transforming means includes a circuit controllable by said processor and coupled between said arithmetic units and said three outputs, for transforming said X, Y and Z coordinate values to effect rotation and scaling of the coordinate system within which said values are provided.

11. A digital video effects apparatus according to claim 10, wherein the said circuit for effecting rotation and scaling of the coordinate system comprises a multiplier stage in the form of a grid of multipliers each capable of being controlled by said processor to apply a corresponding weighting, one output of each said arithmetic unit being coupled to inputs of multipliers of a respective row of said grid, and outputs of multipliers of respective columns of said grid being coupled to corresponding inputs of an adding stage having outputs providing the rotated and scaled X, Y and Z coordinate values.

* * * * *